June 25, 1929. B. D. ENLUND 1,718,687

METHOD OF DETERMINING THE CONTENT OF FOREIGN SUBSTANCES IN IRON AND STEEL

Filed Aug. 16, 1927

INVENTOR
BROR DAVID ENLUND.
BY
ATTORNEY

Patented June 25, 1929.

1,718,687

UNITED STATES PATENT OFFICE.

BROR DAVID ENLUND, OF DEGERFORS, SWEDEN, ASSIGNOR TO HENNING ENLUND, OF BINGHAMTON, NEW YORK.

METHOD OF DETERMINING THE CONTENT OF FOREIGN SUBSTANCES IN IRON AND STEEL.

Application filed August 10, 1927. Serial No. 213,296.

The primary object of my invention is to provide a method for determining the content of a foreign substance in iron and steel by measuring the specific electric resistance of the same and applying the measurement to a chart on which the result can be directly determined without calculations.

Another object is to provide such a method which is readily adaptable for use both at the furnaces or point of manufacture as well as in the laboratories and places of use. By my improved method, the percentage content of foreign substances of iron and steel may be determined readily and quickly without the necessity of mathematical calculations, thus making it possible to rapidly test the material for these percentages and to do so with relatively unskilled labor.

My improved method is based upon the measurement of the specific electric resistance in iron and steel in a given state of hardened and annealed or normalized or otherwise worked conditions. Through the value of this specific electric resistance, I can obtain the percentage content of foreign substances in the material. I accomplish this purpose by the use of suitable charts which I have prepared and which are used in conjunction with a suitable instrument for measuring the specific electric resistance of the material. These charts have been prepared with a view to eliminate all necessity of calculations in order that accurate readings may be made by an unskilled party or one not familiar with the mathematical calculations necessary to determining the content of foreign elements in a given material.

Referring now to the figures of the drawing wherein like reference numerals indicate like parts:—

It should be stated at the outset that if in iron or steel a foreign substance or foreign substances are included in varying percentages, the specific electric resistance of the material will necessarily vary with the percentages of such foreign substance or substances. Obviously, therefore, if these foreign substances give to the material different properties when such substances are present in greater or less percentages, it is obvious that those changes in properties of the material are in a more or less degree directly in relation to the percentages of such foreign substances and accordingly can be measured by the varying specific electric resistance of the material.

In describing my invention, I will use as an illustration of the applicability thereof, the method of determining the percent of carbon in steel.

I will now describe my invention in connection with the determination of the percent of carbon in steel, this being illustrative of the wide application of my invention.

In carrying out my method for determining the carbon content in steel, a length of steel is taken of a suitable cross section, limited only by the size of the apparatus used for making the measurements. If the testing method is to be performed at the furnaces, this length of test bar may be directly rolled or forged to the required size. If the measurement is to be made in the laboratory, it may be taken from stock. From one end of this test bar, there is measured off a given length of say one foot. A mark, preferably a chisel cut is made at this point in the bar, and the end so marked off is then heated in any desired manner to say 1,000 degrees centigrade. This heated end is thereupon quenched in water or oil, or otherwise rapidly cooled and broken from the bar at the chisel cut or mark. There is thus provided a test bar of hardened steel. A similar length is now measured off upon the remaining bar and similarly marked or cut and likewise heated to the same temperature. This portion instead of being rapidly cooled, is allowed to cool slowly and when cooled is broken off at the mark or cut. This provides a second test bar of annealed or normalized steel, one being hardened and the other annealed, or normalized. With these test bars, the measurements are made for this specific application of my improved method.

Figure 1:
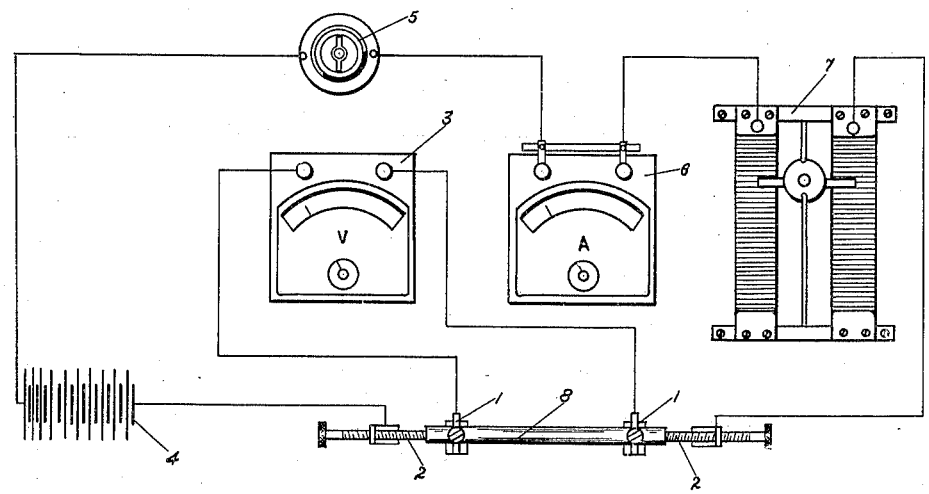
Figure 1 is a diagrammatic view illustrating a form of apparatus for measuring the specific electric resistance of the material to be tested.

The hardened test bar is now placed in suitable clamps 1 where it is supported for engagement at either end by contact members 2, engageable with such ends. Clamps 1 are also contact members and included in the circuit with them is a volt meter 3. The contacts 2 lie in a circuit which includes a source of current, such as a battery 4, a switch 5, an ampère meter 6, and one or more rheostats 7. With the hardened test bar now supported in the clamps 1, and the contacts 2 engaging the ends thereof, the switch 5 is closed allowing the current from the battery 4 to pass through the test bar and register upon the volt meter and ampère meter, readings from which the specific electric resistance of the test bar in micro-ohms can be readily computed. This resistance is noted and the hardened test bar removed from the measuring apparatus and the annealed or normalized test bar placed therein and its specific electric resistance likewise measured and this specific resistance noted. In Figure 1, the reference character 8 indicates a test bar in position for measuring its resistance.

It should be stated here that the particular apparatus for measuring the specific electric resistance of these test bars, forms no part of the invention herein described and claimed, and many forms of apparatus may be substituted for that shown. In fact, any suitable electric resistance measuring apparatus may be employed in carrying out my invention.

Figure 2:
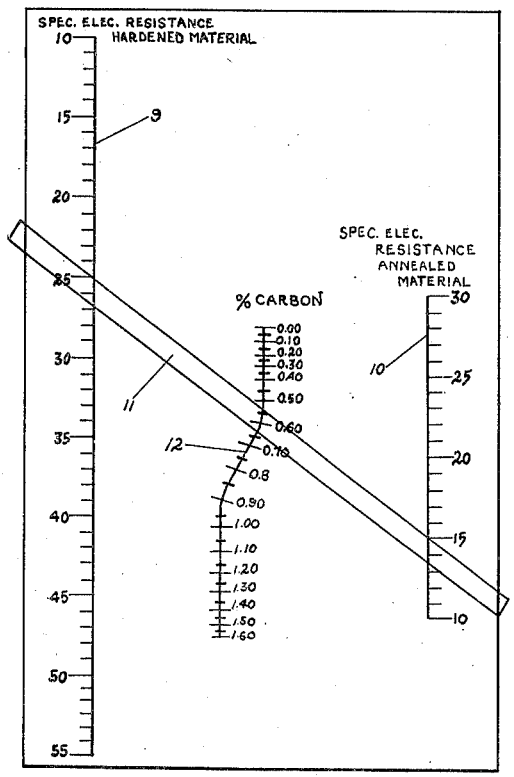
Figure 2 is a plan view of a chart used in connection with the resistance measuring apparatus upon which can be read the carbon content of the tested material.

Now having the specific electric resistance of the hardened test bar and of the annealed, or normalized test bar, it is desired to determine the percent of carbon in the steel from which these test bars are taken. For this purpose, a chart such as that shown in Figure 2 is used. It will be noted that on this chart, there is a scale at the left indicated at 9 graduated in units of resistance, preferably micro-ohms and reading from top to bottom. On the right of the chart, there is a similar though shorter scale calibrated in the same units of resistance and on the same proportion with the scale on the left, this scale, however, reading from bottom to top. This scale is indicated at 10. Assuming now that the specific electric resistance of the above mentioned hardened test bar measured 25 micro-ohms and the specific electric resistance of the annealed or normalized test bar measured 15 micro-ohms, the tester now takes a straight edge such as a transparent rule 11, placing one edge thereof at the point "25" on the left hand scale and the same edge at the point "15" on the right hand scale. The point at which this straight edge 11 crosses the middle scale 12, calibrated in units of percentage, indicates to the operator at a glance the percent of carbon in the steel which has been tested.

This chart may be made up by performing a series of tests, that is, measurements of specific electric resistance, of test pieces of steel having known percentages of carbon, and the scales arranged on the chart in such manner that in comparing the specific electric resistance measurements as above described, the middle scale will properly indicate the carbon percent.

It will be understood that other types and forms of charts than that herein shown may be prepared to accomplish the same purpose. The one illustrated, however, is illustrative of a very simple form, by means of which the percentage of foreign substances in the material to be tested can be quickly and accurately determined once the specific electric resistance of the material is measured.

By this method the makers of steel can quickly and easily gauge accurately the quality of the product. Likewise, the purchaser or user of steels can similarly and very quickly check up by the same method and determine if the delivered material is according to the specifications as ordered.

Obviously, many changes may be made by way of detail in the form and method of use of my invention without departing from the spirit and scope thereof. I do not limit myself therefore to the forms shown and described herein other than by the appended claims.

I claim:—

1. The method of determining the percentage of a foreign substance in iron and steel, including the steps of measuring the specific electric resistance of hardened and annealed or normalized test pieces of the material to be tested and comparing such measurements with known factors.

2. The method of determining the percentage of a foreign substance in iron and steel, including the steps of measuring the specific electric resistance of hardened and annealed or normalized test pieces of the material, and comparing such measurements with indications on a prepared chart from which can be read directly the percentage of such foreign substance for said measurements.

3. The method of determining the percentage of a foreign substance in iron and steel, including the steps of measuring the specific electric resistance of hardened and annealed or normalized test pieces of the material, comparing such measurements on independent scales of a chart and reading directly the foreign substance content of the material having such measurements from a third scale on said chart.

4. The method of determining the percentage of carbon content in iron and steel, including the steps of making two test bars from such material, one hardened and the other annealed or normalized, measuring the specific electric resistance of said test bars, comparing said measurements on oppositely disposed scale of a chart, placing a straight edge across said scales at the point of such measurements and reading directly from a third scale between said first two mentioned scales, the percentage of the carbon content at the point where said straight edge crosses said central scale.

BROR DAVID ENLUND.